US012671732B2

(12) United States Patent
Klein et al.

(10) Patent No.: US 12,671,732 B2
(45) Date of Patent: Jun. 30, 2026

(54) DISTRIBUTED TRANSACTIONS OVER BROADCAST COMMUNICATION CHANNEL WITHIN MICROSERVICES ENVIRONMENT

(71) Applicant: ADP, Inc., Roseland, NJ (US)

(72) Inventors: Eitan Klein, James, NY (US); Jonathan Baier, Lovettsville, VA (US); Mohammed Balal Ahmed, Jersey City, NJ (US)

(73) Assignee: ADP, Inc., Roseland, NJ (US)

( * ) Notice: Subject to any disclaimer, the term of this patent is extended or adjusted under 35 U.S.C. 154(b) by 98 days.

(21) Appl. No.: 17/875,548

(22) Filed: Jul. 28, 2022

(65) Prior Publication Data

US 2024/0039981 A1 Feb. 1, 2024

(51) Int. Cl.
*H04L 67/10* (2022.01)
*H04L 67/63* (2022.01)

(52) U.S. Cl.
CPC .............. *H04L 67/10* (2013.01); *H04L 67/63* (2022.05)

(58) Field of Classification Search
CPC ................................ H04L 67/10; H04L 67/63
USPC ........................................................ 709/201
See application file for complete search history.

(56) References Cited

U.S. PATENT DOCUMENTS 7,143,132 B2 11/2006 Klein et al.
11,874,822 B1 * 1/2024 Singh ................. G06F 16/2315

2020/0257676 A1 * 8/2020 Zhang ................. G06F 12/0804
2020/0344310 A1 * 10/2020 Todd ........................ H04L 67/60
2021/0058455 A1 * 2/2021 Kozhaya .............. H04L 47/805
2021/0117249 A1 * 4/2021 Doshi ................. H04L 67/1001
2021/0135857 A1 * 5/2021 Parvataneni .......... H04L 67/104
2022/0066775 A1 * 3/2022 Liu ........................ G06F 9/5011
2022/0067024 A1 * 3/2022 Pethe ...................... G06F 16/25
2022/0398555 A1 * 12/2022 Noda ...................... H04L 67/12

(Continued)

OTHER PUBLICATIONS

Choudhury: "Implementing Distributed Transactions the Google Way: Percolator vs. Spanner", https://medium.com/yugabyte/implementing-distributed-transactions-the-google-way-percolator-vs-spanner-6cbccfc1f2ed, Jul. 24, 2018, 8 pages.

(Continued)

*Primary Examiner* — Suraj M Joshi
*Assistant Examiner* — Ayele F Woldemariam
(74) *Attorney, Agent, or Firm* — Foley & Lardner LLP

(57) ABSTRACT

Aspects of the present disclosure relate to distributed transactions over a broadcast communication channel within a microservices environment. In embodiments, a method includes: receiving a request to process distributed transactions input in a data schema in order to perform a task of an application in a cloud computing environment; broadcasting to a plurality of microservices a multicast message requesting availability to execute the distributed transactions in the data schema; receiving confirmation of preparation from at least one of the plurality of microservices to execute one or more of the distributed transactions in the data schema; sending at least one unicast message to the at least one of the of the plurality of microservices to execute the one or more of the distributed transactions in the data schema; and receiving an acknowledgement of the execution of each of the distributed transactions in the data schema.

22 Claims, 6 Drawing Sheets

(56)                     References Cited

U.S. PATENT DOCUMENTS

2023/0018975 A1*   1/2023   Sreenivasan ........ G06F 16/2379

OTHER PUBLICATIONS

Joshi: "Two Phase Commit", https://martinfowler.com/articles/patterns-of-distributed-systems/two-phase-commit.html, Jan. 18, 2022, 39 pages.
Pardue et al.: "Hypertext Transfer Protocol (HTTP) over multicast QUIC draft-pardue-quic-http-mcast-00", BBB Research & Development, https://datatracker.ietf.org/doc/html/draft-pardue-quic-http-mcast-00, 2017, 41 pages.
Anonymous: "DB2 Version 9.7 for Linux, UNIX, and Windows—Error recovery during two-phase commit", https://www.ibm.com/docs/en/db2/9.7?topic=databases-error-recovery-during-two-phase-commit, Mar. 1, 2021, 3 pages.
Pullen et al.: "Selectively Reliable Multicast Protocol (SRMP)", https://www.rfc-editor.org/rfc/rfc4410.html, Feb. 2006, 30 pages.
Anonymous: "DB2 Version 9.7 for Linux, UNIX, and Windows—Two-phase commit", https://www.ibm.com/docs/en/db2/9.7?topic=databases-two-phase-commit, Mar. 1, 2021, 3 pages.

* cited by examiner

DISTRIBUTED TRANSACTIONS OVER BROADCAST COMMUNICATION CHANNEL WITHIN MICROSERVICES ENVIRONMENT

TECHNICAL FIELD

The present disclosure relates generally to microservices in a cloud computing environment and, more particularly, to distributed transactions over a broadcast communication channel within a microservices environment.

BACKGROUND

Current application platforms promote rapid integration of many applications into an entire ecosystem of applications used by their customers and partners. Services can be decoupled from the input interfaces of applications in the ecosystem and decomposed into encapsulated microservices that operate independently. As tasks occur in an organization, the input interfaces of applications can be populated with information for accomplishing specific tasks with the information input packaged as events and the events entered into an event stream for processing by microservices in a cloud computing environment to accomplish the task.

For example, onboarding a new employee into a company involves many services including adding a new employee to the payroll system, connecting the new employee with a benefits provider, adding the new employee to the organization chart, and perhaps enrolling the new employee in orientation programs, and so on. Such services may be implemented as microservices that process the new employee information pulled from an event stream as events.

SUMMARY

In an aspect of the present disclosure, a method includes: receiving, by a computing device, a request to process distributed transactions input in a data schema in order to perform a task of an application in a cloud computing environment; broadcasting, by the computing device, to a plurality of microservices in the cloud computing environment a multicast message requesting availability to execute the distributed transactions in the data schema; receiving, by the computing device, confirmation of preparation from at least one of the plurality of microservices in the cloud computing environment to execute one or more of the distributed transactions in the data schema; sending, by the computing device, at least one unicast message to the at least one of the of the plurality of microservices in the cloud computing environment to execute the one or more of the distributed transactions in the data schema; and receiving, by the computing device, an acknowledgement of the execution of each of the distributed transactions in the data schema from the at least one of the plurality of microservices in the cloud computing environment.

In another aspect of the present disclosure, there is a computer program product including one or more computer readable storage media having program instructions collectively stored on the one or more computer readable storage media. The program instructions are executable to: receive, by a computing device, a multicast message requesting availability of a microservice to perform transactions in a data schema; send, by the computing device, a multicast message identifying the microservice available to perform one or more of the transactions in the data schema; prepare, by the computing device, to execute the one or more of the transactions in the data schema, including obtaining resource locking on data in at least one database; execute, by the computing device, the one or more of the transactions in the data schema; and send in a multicast message, by the computing device, an acknowledgement that the one or more of the transactions in the data schema were executed by the microservice.

In a further aspect of the present disclosure, there is a computer system including a processor, a computer readable memory, one or more computer readable storage media, and program instructions collectively stored on the one or more computer readable storage media. The program instructions are executable to: receive, by a computing device, a request to process distributed transactions input in a data schema in order to perform a task of an application in a cloud computing environment; broadcast, by the computing device, to a plurality of microservices in the cloud computing environment a multicast message requesting availability to execute the distributed transactions in the data schema; receive, by the computing device, confirmation of preparation from at least one of the plurality of microservices in the cloud computing environment to execute one or more of the distributed transactions in the data schema; determine, by the computing device, confirmation of preparation has not been received to execute each of the distributed transactions in the data schema from the at least one of the plurality of microservices in the cloud computing environment; and send, by the computing device, at least one unicast message to the at least one of the plurality of microservices to abort the execution of the one or more of the distributed transactions in the data schema.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
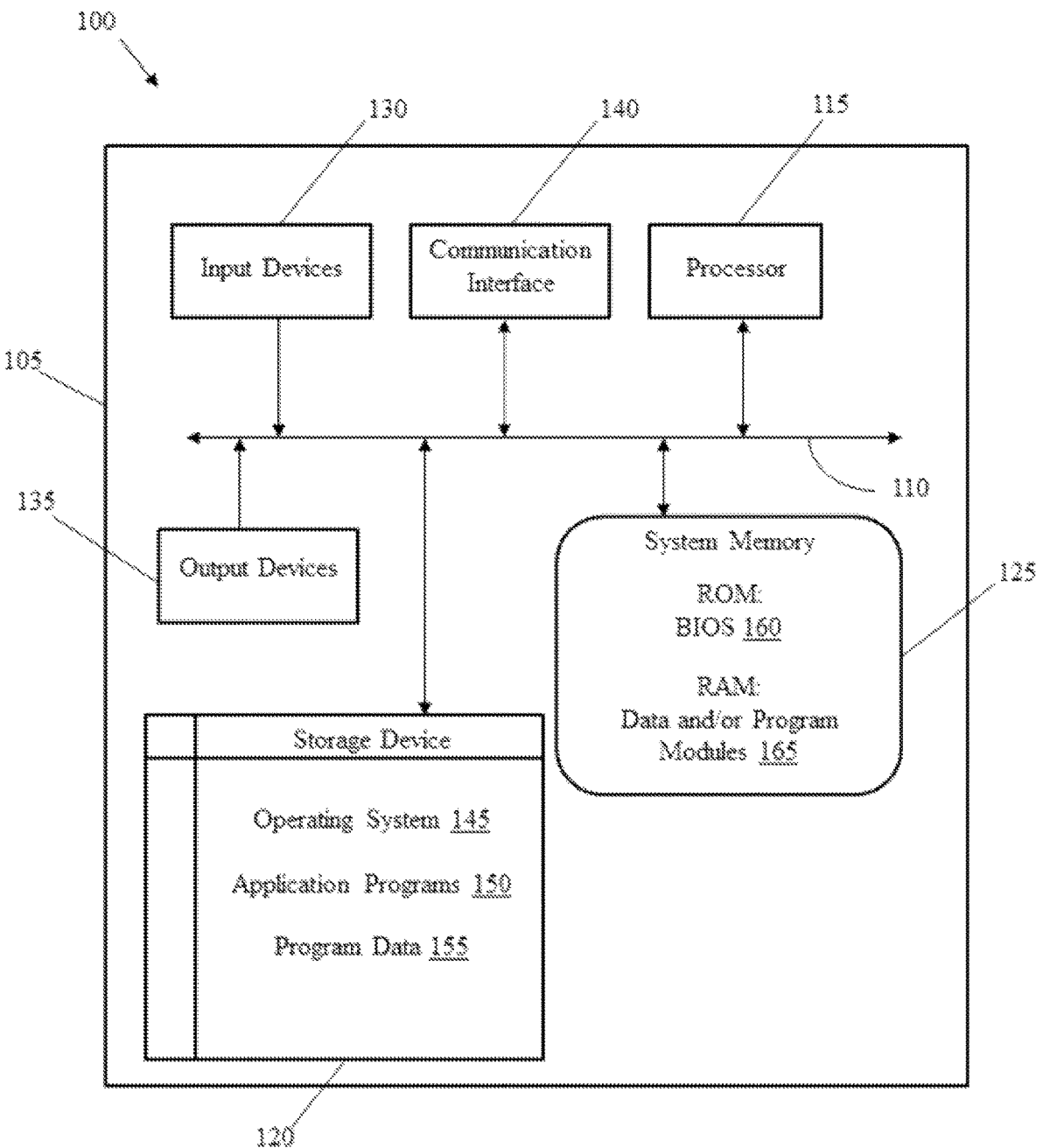
FIG. 1 is an illustrative architecture of a computing system according to embodiments of the present disclosure.

The present disclosure relates generally to microservices in a cloud computing environment and, more particularly, to distributed transactions over a broadcast communication channel within a microservices environment. In more specific embodiments, the present disclosure provides a novel communication tunnel, a direct User Datagram Protocol (UDP) tunnel, with the ability to directly connect to all microservices. For example, an application ecosystem for human capital management such as ADP® NextGen HCM can now perform tasks specifying distributed transactions with data integrity by directly connecting to multiple microservices coupled to various databases designed to serve different needs. Advantageously, aspects of the present disclosure provide a novel mechanism to push events of an application task that include many separate data transactions to available microservices executing in a cloud computing environment and selectively distribute transactions among the available microservices while ensuring data integrity of performing the distributed transactions of the application task.

In more specific embodiments, a client device receives data to populate a data schema with distributed transactions to be executed by microservices in a cloud computing environment. For example, the input interfaces on a client device may receive information, such as personnel information, benefits information, payroll information, and so forth for the task of onboarding new personnel. The client device sends a multicast message requesting performance of the distributed transactions populated in the data schema to a transaction coordinator module in the cloud computing environment. For instance, the client device may send the data schema via a User Datagram Protocol (UDP) tunnel in Hypertext Transfer Protocol (HTTP) or RESTful (REST) protocol messages to the transaction coordinator. The transaction coordinator provides services for receiving messages with distributed transactions, broadcasting a request to microservices in a cloud computing environment for availability to perform one or more of the distributed transactions, receiving confirmation of preparation to execute one or more of the distributed transactions from microservices, and selectively requesting microservices to execute the distributed transactions. Each selected microservice can prepare to execute one or more of the distributed transactions to achieve overall atomicity in performing the distributed transactions of the application task, including obtaining resource locking on data in databases to perform the data transactions, among other preparations such as allocating sufficient memory for processing the data transactions.

Aspects of the present disclosure are directed to improvements in computer-related technology. Broadcasting distributed transactions over a broadcast communication channel within a microservices environment provides a technical solution to a problem arising from integration of many applications into an entire ecosystem of applications that need to perform distributed transactions of application tasks by microservices executing in a cloud computing environment. The systems, methods, and computer program products of the present disclosure provide a novel communication tunnel with the ability to directly connect to all microservices. Advantageously, this novel mechanism pushes events of an application task that include many separate data transactions by broadcasting to available microservices executing in a cloud computing environment and selectively distributing transactions among the available microservices while ensuring data integrity of performing the distributed transactions of the application task.

In doing so, this unconventional technical solution changes the way computers operate in communicating and processing distributed transactions within a microservices environment by the technological improvements of establishing a new communication tunnel within the microservices with the ability to directly connect all microservices, among other features as described herein. Unlike conventional systems where microservices that process transactions of application tasks are pulled from an event stream, a computer system implementing the technological improvements of the present disclosure may push events of an application task that include many separate data transactions by broadcasting to available microservices executing in a cloud computing environment and selectively distributing transactions among the available microservices while ensuring data integrity of performing the distributed transactions of the application task. This novel technical solution changes the way computers operate in communicating and processing distributed transactions within a microservices environment and may be generally applied to change the way computers operate in communicating and processing distributed transactions in containerization technology and other distributed processing architectures with processes that operate independently to accomplish distributed transactions of an application task.

The systems, methods, and computer program products of the present disclosure are directed to further improvements in computer-related technology. A new distributed transaction control mechanism in a microservices environment provides an unconventional two-phase commit protocol to process distributed transactions by microservices to achieve atomicity and reliability. In embodiments, the system including a processor, a computer readable memory, one or more computer readable storage media, and program instructions collectively stored on the one or more computer readable storage media may receive a request to process distributed transactions input in a data schema in order to perform a task of an application in a cloud computing environment and broadcast to microservices in the cloud computing environment a multicast message requesting availability to execute the distributed transactions in the data schema. The transaction control mechanism applies the unconventional two-phase commit protocol to process distributed transactions in the microservices environment by sending requests for and receiving confirmation of preparation to execute one or more of the distributed transactions by selected microservices, and by sending request for and receiving acknowledgement of execution of the distributed transactions by selected microservices. The new distributed transaction control mechanism provides a technical solution to a problem of resource conflicts arising in conventional microservices architectures from optimistic concurrency control of distributed transactions in event streaming. This novel technical solution that changes the way computers operate in processing distributed transactions within a microservices environment may also be generally applied to change the way computers operate in processing distributed transactions in containerization technology and other distributed processing architectures with processes that operate independently to accomplish distributed transactions of an application task.

Implementations of the present disclosure may be a system, a method, and/or a computer program product. The computer program product may include a computer readable storage medium (or media) having computer readable program instructions thereon for causing a processor to carry out aspects of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100. Moreover, the system and method described herein may be implemented in the computing system 100 or provided on a computer program product.

Figure 2:
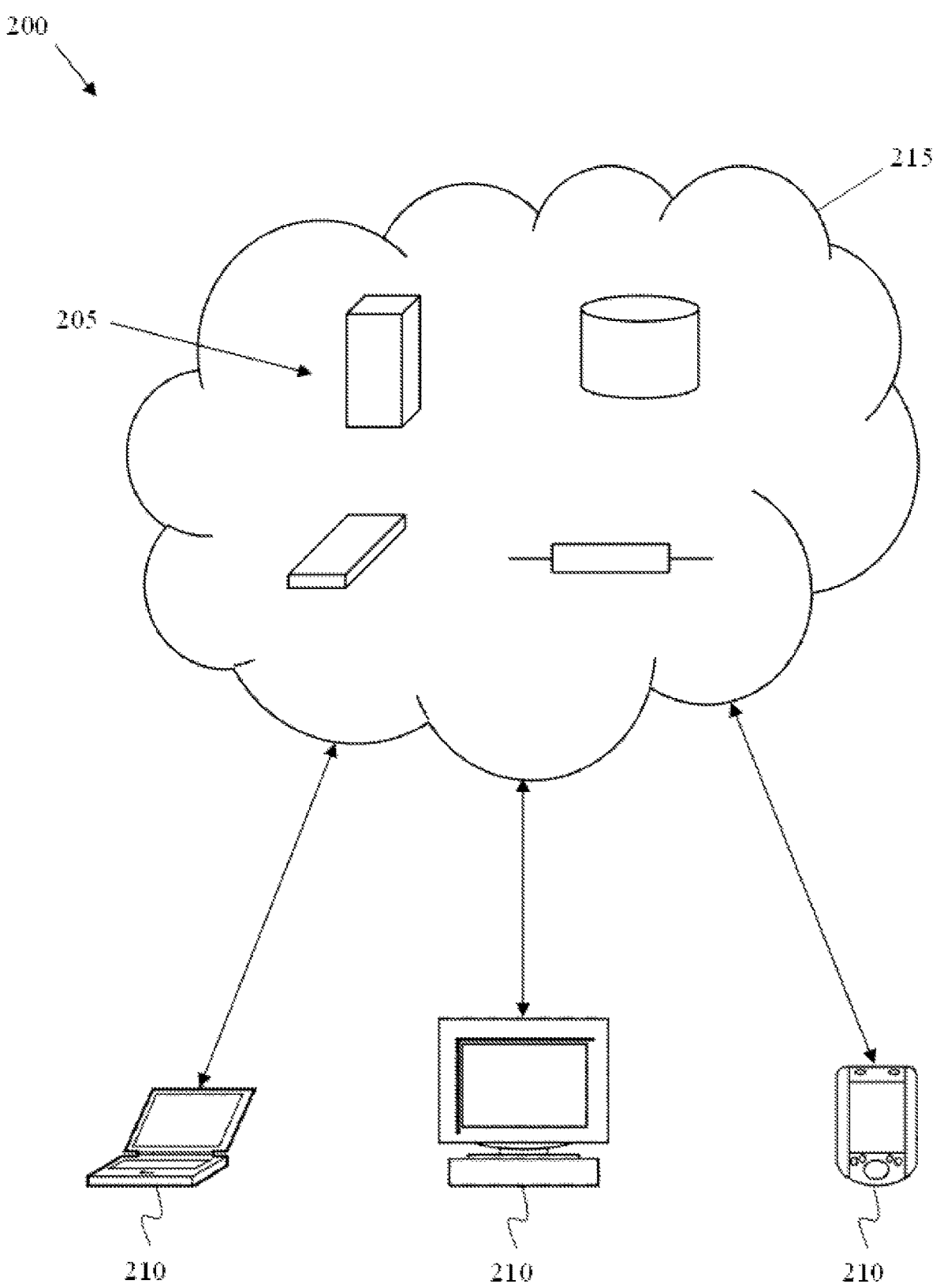
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example, processor 115 enables the computing device 105 to provide services for receiving events with distributed transactions, broadcasting a request to microservices in a cloud computing environment for availability to perform one or more of the distributed transactions, receiving confirmation of preparation to execute one or more of the distributed transactions from microservices, and selectively requesting microservices to execute the distributed transactions, as described in more detail herein.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured as a special-purpose computing device providing reliable distributed transactions in a data communication architecture that directly connects to microservices in an application ecosystem. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
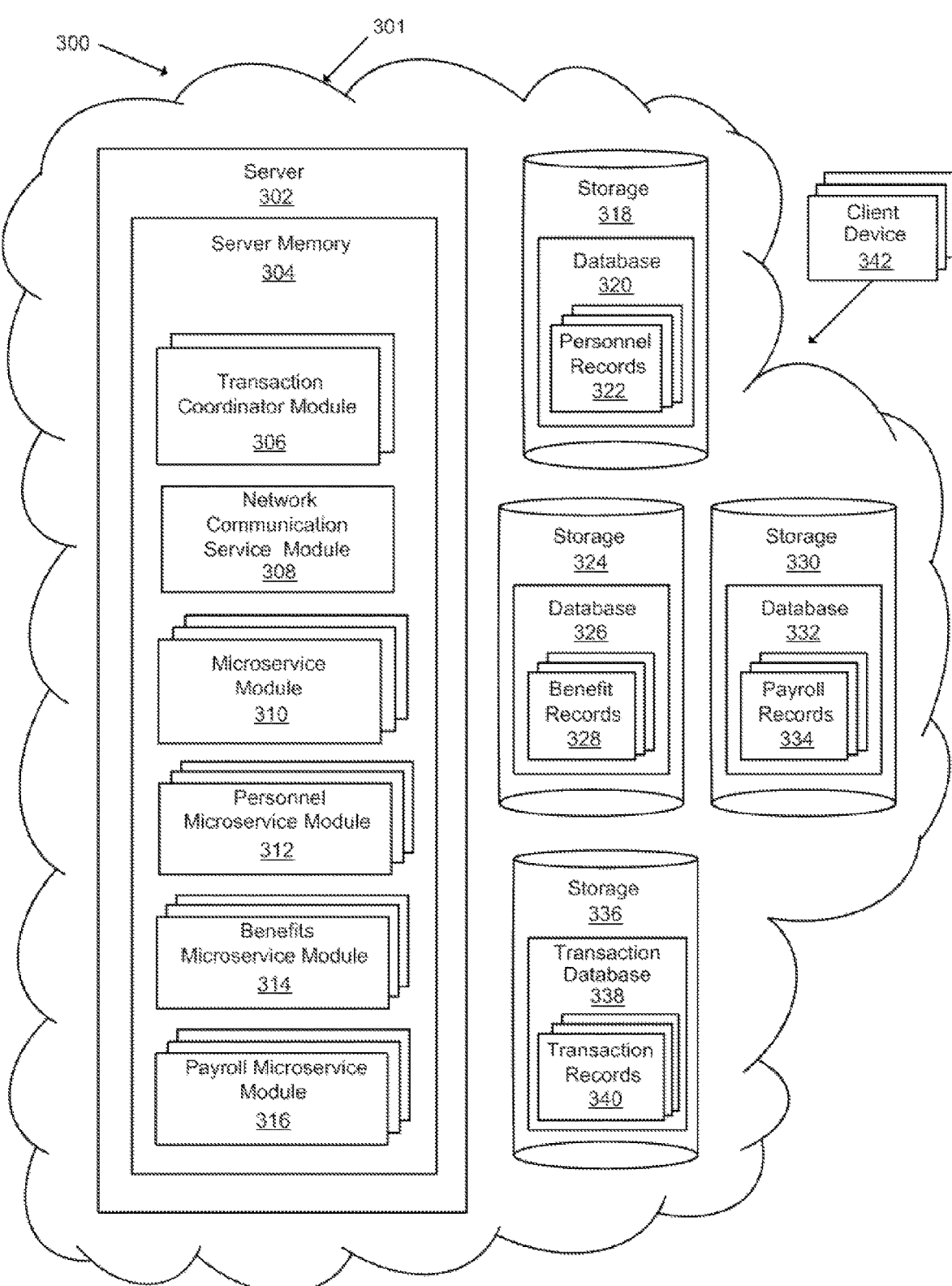
FIG. 3 is a block diagram illustrating an exemplary environment in accordance with aspects of the present disclosure.

FIG. 3 shows a block diagram of a server in a cloud computing environment in accordance with aspects of the present disclosure. In embodiments, the cloud computing environment 300 includes a server 302, which may be a computing device such as a computing device 105 described with respect to FIG. 1 and is a cloud resource such as cloud resource 205 described with respect to FIG. 2, available to client devices 342 via a network 301, such as the Internet. In embodiments, the server 302 supports services for coordinating distributed transactions of application tasks for reliable processing by microservices in a cloud computing environment.

Server 302 includes, in a server memory 304, such as memory 125 described with respect to FIG. 1, a transaction coordinator module 306 having functionality for receiving data processing requests with distributed transactions, broadcasting a request to microservices, such as microservice module 310, in a cloud computing environment for discovering availability to perform one or more of the distributed transactions, receiving confirmation of preparation to execute one or more of the distributed transactions from microservices, and selectively requesting microservices to execute the distributed transactions. Server 302 also includes, in a server memory 304, network communication service module 308 having functionality to support network communications protocols for sending and receiving messages to and from microservices, such as microservice module 310, and the transaction coordinator module 306. There may be a multicast socket or port of a control group that includes the transaction coordinator module, a logger (not shown) to log messages and other executables. In implementation, the network communication service module 308 may provide a User Datagram Protocol (UDP) tunnel in Hypertext Transfer Protocol (HTTP) or RESTful (REST) protocol messages to broadcast messages via multicast UDP protocol, provide a Real-time Transport Protocol (RTP) tunnel in HTTP or REST protocol messages, or use other multicast protocol.

The server 302 also includes, in a server memory 304, plural microservice modules 310, each having functionality to receive a request to identify availability to process distributed transactions in a data processing request, prepare to execute the transactions including obtaining resource locking on data in databases, receive a request to perform the transactions and execute the transactions. Specific examples of microservices modules 310 for processing transactions for onboarding new personnel in an organization may include, for instance, a personnel microservices module 312 for processing personnel information, a benefits microservices module 314 for processing benefits information, and a payroll microservices module 316 for processing payroll information, among many other microservices modules necessary to onboard new personnel. In embodiments, the microservices modules may be implemented as containers, bundling the application code together with the related configuration files, operating system (OS) libraries, and dependencies required for each container to run as a single lightweight executable.

The transaction coordinator module 306, the network communication service module 308, the microservices module 310, the personnel microservices module 312, the benefits microservices module 314, and the payroll microservices module 316 may each comprise one or more program modules such as program modules 165 described with respect to FIG. 1. The system may include additional or fewer modules than those shown in FIG. 3. For example, separate modules may be integrated into a single module or a single module may be implemented as multiple modules. Moreover, in practice, the environment may include additional devices and/or networks; fewer devices and/or networks; different devices and/or networks; or differently arranged devices and/or networks than illustrated in FIGS. 1-3.

In accordance with aspects of the disclosure, FIG. 3 also shows a block diagram of several storage systems in a cloud computing environment in accordance with aspects of the present disclosure. In embodiments, the cloud computing environment 300 includes a storage 318, a storage 324, a storage 330, and a storage 336, each of which may be a computing device such as a computing device 105 described with respect to FIG. 1 and may be a cloud resource such as cloud resource 205 described with respect to FIG. 2 that communicates with the server 302 via a network 301, such as the Internet.

In embodiments, the storage 318 may store a database 320 of personnel records 322 which may be accessed by personnel microservice module 312 to perform transactions such as adding, deleting, or changing data in personnel records 322. The storage 324 may, in embodiments, store a database 326 of benefits records 328 which may be accessed by benefits microservice module 314 to perform transactions such as adding, deleting, or changing data in benefits records 328. The storage 330 may, in embodiments, store a database 332 of payroll records 334 which may be accessed by payroll microservice module 316 to perform transactions such as adding, deleting, or changing data in payroll records 334. And the storage 336 may, in embodiments, store a transaction database 338 of transaction records 340 which may be accessed by the transaction coordinator module 306 to perform transactions such as adding, deleting, or changing status of data transactions in transaction records 334. These storage systems are illustrative examples of storage systems used for onboarding personnel in enterprises, and those skilled in the art should appreciate that many other databases storing different kinds of records may be necessary for onboarding new personnel, such as a database of compliance records, a database of tax records, a database of time-off records, and a database of organization members, to name a few.

In accordance with aspects of the disclosure, FIG. 3 also shows client device 336 that communicates with server 302 in the cloud computing environment 400. The server 302 supports services for coordinating distributed transactions for data requests populated by input interfaces on client device 336. For instance, the input interfaces on client device 336 may populate personnel data, benefits data, payroll data, and so forth for onboarding new personnel, for example, in a data schema representing a series of data transactions in embodiments to be performed to successfully complete the task of onboarding new personnel. In embodiments, the data transactions for a given task, such as onboarding new personnel for example, may be put in a single data schema, or the data transactions for a given task may be put in several data schemas.

The transaction coordinator module 306 in server memory 304 of server 302 receives the data schema with data transactions and coordinates distributed execution of the transactions for reliable processing by microservices in a cloud computing environment. The client device 336 may be a computing device such as a computing device 105 described with respect to FIG. 1 and may be a client device 210 described with respect to FIG. 2 that communicates with the server 302 via a network 301, such as the Internet. In embodiments, a web browser-based portal can be used to provide a client-side implementation of the client device 336 in operations of a cloud-based service providing an application ecosystem. Any other configuration can also be used in an implementation of the client device 336 in operations of a cloud-based service providing an application ecosystem, including, for example, a fat client mode, a thin client mode, or a hybrid client mode.

Figure 4:
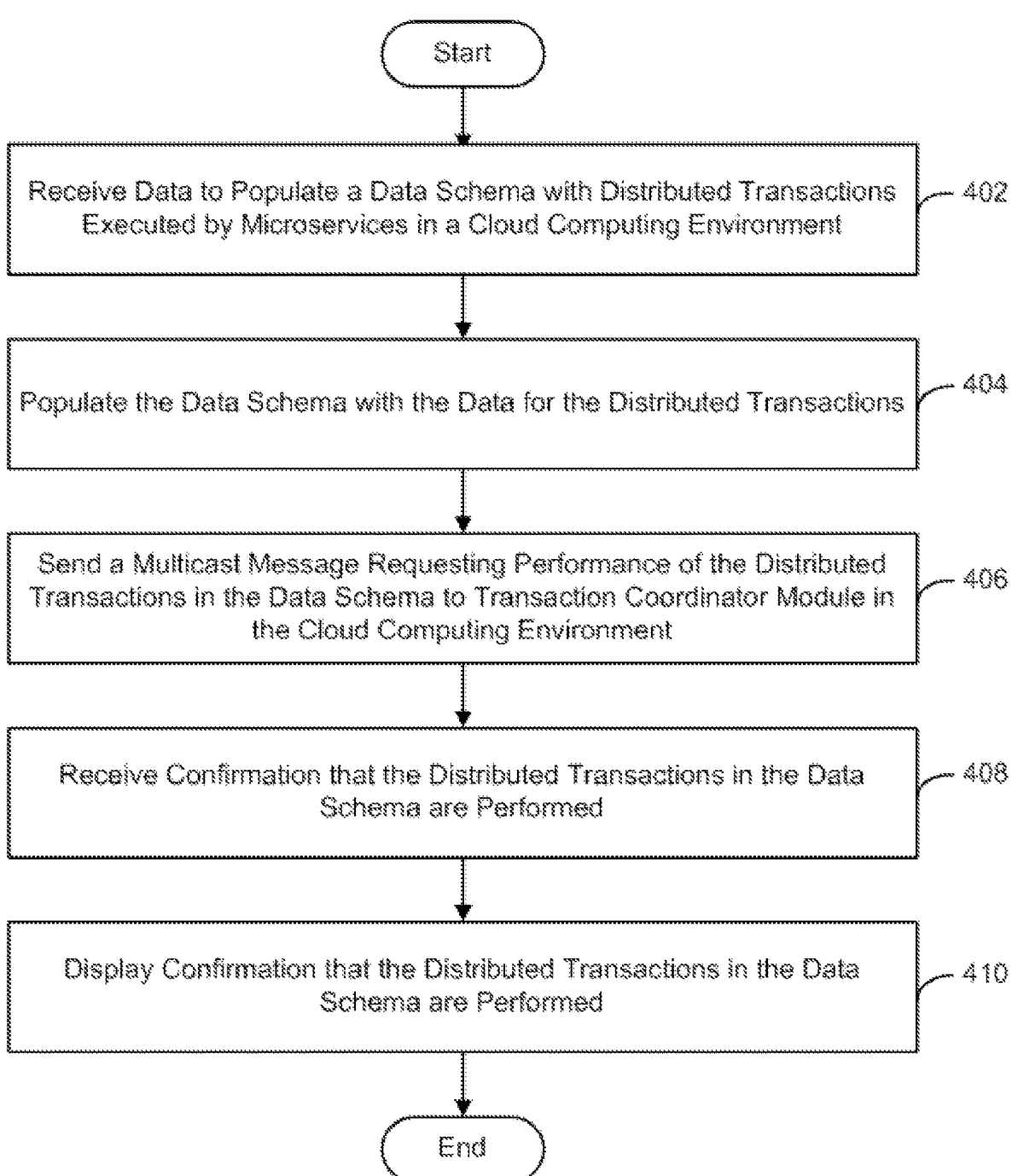
FIG. 4 shows a flowchart of an exemplary method in accordance with aspects of the present disclosure.
Figure 5:
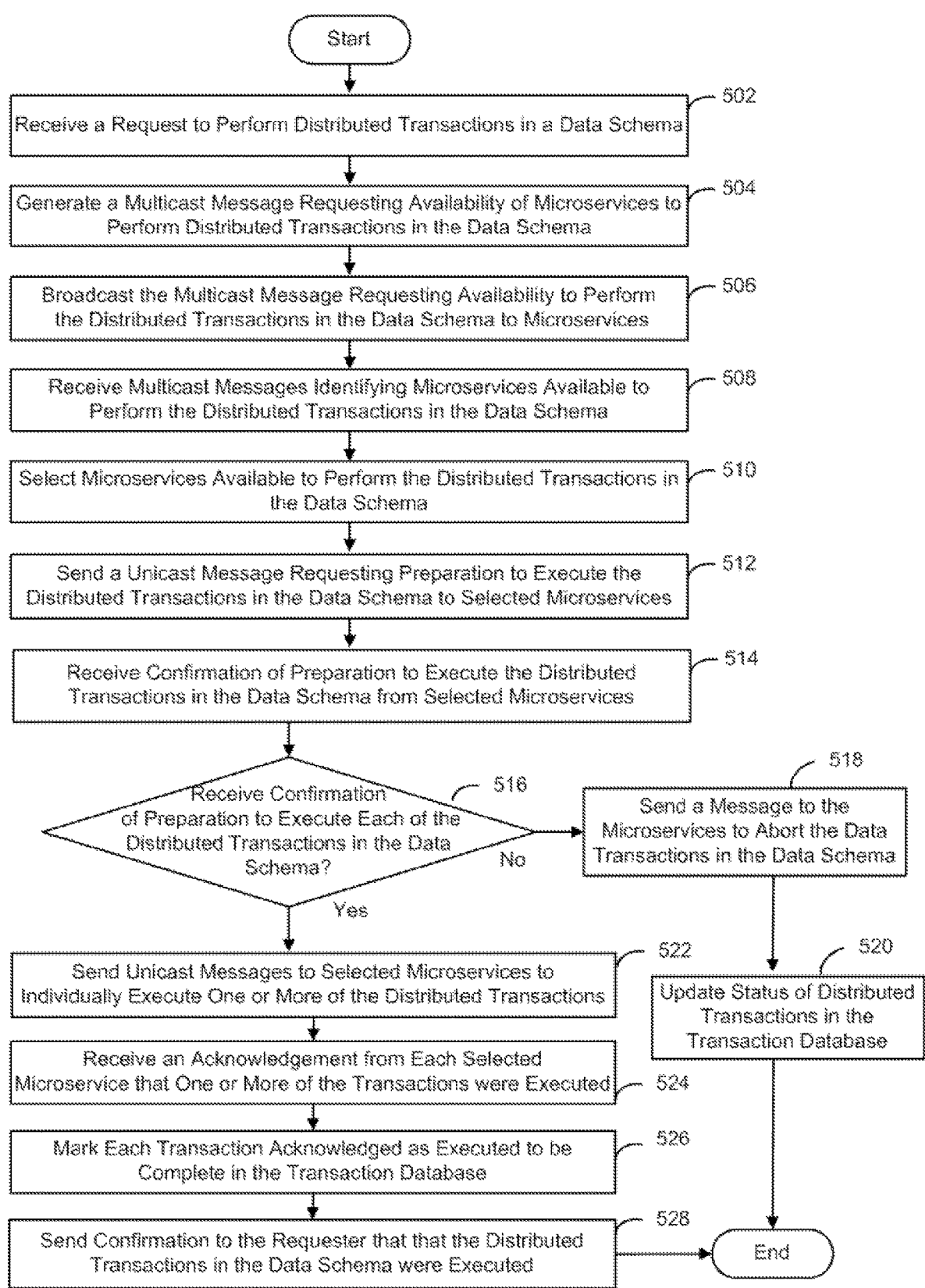
FIG. 5 shows a flowchart of an exemplary method in accordance with aspects of the present disclosure.
Figure 6:
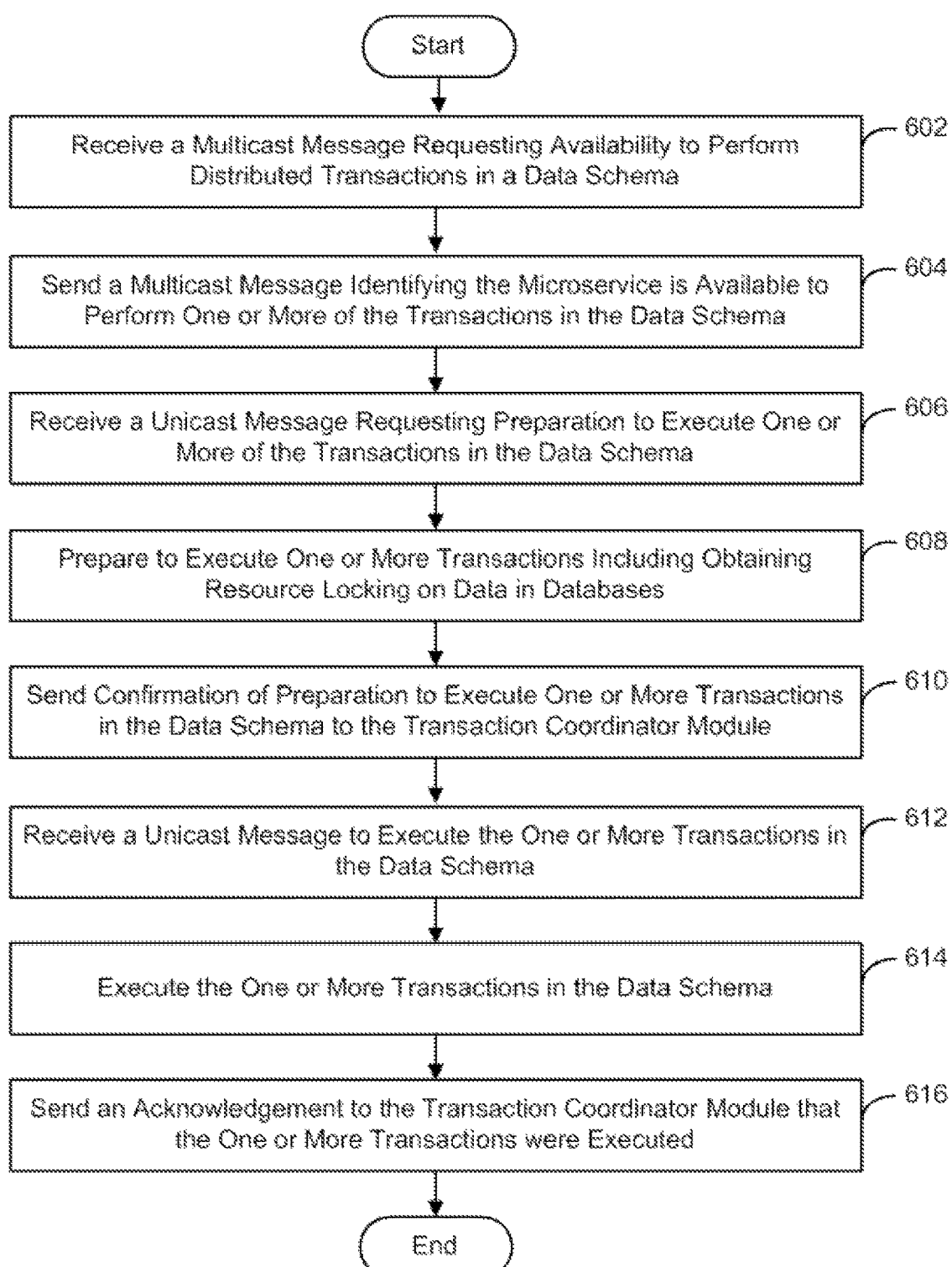
FIG. 6 shows a flowchart of an exemplary method in accordance with aspects of the present disclosure.

FIGS. 4-6 show flowcharts and/or block diagrams that illustrate the architecture, functionality, and operation of implementations of systems, methods, and computer program products according to various embodiments of the present disclosure. Each block may represent a module, segment, or portion of instructions, which comprises one or more executable instructions for implementing the specified logical function(s). The functions noted in the blocks may occur out of the order, two blocks shown in succession may, in fact, be accomplished as one step, executed concurrently, substantially concurrently, in a partially or wholly temporally overlapping manner, or the blocks may sometimes be executed in the reverse order, depending upon the functionality involved. And some blocks shown may be executed and other blocks not executed, depending upon the functionality involved.

Moreover, the exemplary flowcharts and/or block diagrams can be illustrative of a system, a process, and/or a computer program product and related functionality implemented on the computing system of FIG. 1. The computer program product may include computer readable program instructions stored on computer readable storage medium (or media). The computer readable storage medium may include one or more tangible storage medium as described with regard to FIG. 1, e.g., non-transitory media, a tangible device, etc. The processes and/or computer program product implementing the flowcharts and/or block diagrams can be downloaded to respective computing/processing devices, e.g., computing system of FIG. 1 as already described herein, or implemented on a cloud infrastructure as described with regard to FIGS. 2 and 3. Accordingly, the processes associated with the flowcharts and/or block diagrams of the present disclosure can be implemented by special purpose hardware-based systems that perform the specified functions or acts or carry out combinations of special purpose hardware and computer instructions.

FIG. 4 shows a flowchart of an exemplary method in accordance with aspects of the present disclosure. Steps of the method may be carried out in the environment of FIGS. 2 and 3 and are described with reference to elements depicted in FIG. 3. In particular, the flowchart of FIG. 4 shows an exemplary method for a client device in a cloud computing environment to populate information in a data schema representing a series of data transactions to be performed to successfully complete a task in an application ecosystem, in accordance with aspects of the present disclosure.

At step 402, a client device receives data to populate a data schema with distributed transactions to be executed by microservices in a cloud computing environment. For example, the input interfaces on a client device may receive information inputted to accomplish a task, such as personnel information, benefits information, payroll information, and so forth for the task of onboarding new personnel. In embodiments, client device 336 described with respect to FIG. 3, may receive the data to populate a data schema with distributed transactions to be executed by microservices in a cloud computing environment.

At step 404, the client device populates the data schema with the data for the distributed transactions. In embodiments, the data transactions for a given task, such as onboarding new personnel for example, may be put in a single data schema, or the data transactions for a given task may be put in several different data schemas for processing by microservices in a cloud computing environment. For example, the input interfaces on client device 336 may populate personnel data in a data schema with data transactions in an embodiment, and the data schema may include an indication of a microservice for processing the data transactions in the data schema. Similarly the input interfaces on client device 336 may populate benefits data in a separate data schema with data transactions and payroll data in a separate data schema with data transactions in an embodiment, and each of these data schemas may include an indication of different microservices for processing the data transactions in each of these data schemas. The indication of a microservice for processing data transactions in a data schema may include the name of the microservice and version number. In embodiments, client device 336 described with respect to FIG. 3, may populate the data schema with the data for the distributed transactions.

At step 406, the client device sends a multicast message with a data processing request for performance of the distributed transactions in the data schema to a transaction coordinator module in the cloud computing environment. For instance, the client device may send the data processing request with the data schema via a UDP tunnel in an REST message in embodiments to the transaction coordinator. In implementations, the client device may send the data processing request with the data schema via a UDP tunnel or an RTP tunnel in HTTP or REST protocol messages to broadcast messages via multicast UDP protocol, multicast RTP protocol, or other multicast or broadcast protocol. In embodiments, client device 336 described with respect to FIG. 3, may send the request to perform the distributed transactions in the data schema to the transaction coordinator module in the cloud computing environment.

At step 408, the client device receives confirmation that the distributed transactions in the data schema are performed. For example, upon confirmation from the microservices that the distributed transactions were performed, the transaction coordinator may send a message to the client device to confirm the distributed transactions in the data schema were performed. In embodiments, the client device 336 described with respect to FIG. 3, may receive confirmation that the distributed transactions in the data schema are performed.

At step 410, the client device displays confirmation that the distributed transactions in the data schema are performed. For the example of the task of onboarding new personnel, the client device may display confirmation that the data transactions for onboarding new personnel are performed. In embodiments, the client device 336 described with respect to FIG. 3 may display confirmation that the distributed transactions in the data schema are performed.

FIG. 5 shows a flowchart of an exemplary method in accordance with aspects of the present disclosure. Steps of the method may be carried out in the environment of FIGS. 2 and 3 and as further described with reference to elements depicted in FIG. 3. In particular, the flowchart of FIG. 5 shows an exemplary method of coordinating distributed transactions for reliable processing by microservices in a cloud computing environment, in accordance with aspects of the present disclosure.

At step 502, the system receives a request to perform distributed transactions in a data schema. For example, the transaction coordinator may receive a data processing request including the data schema populated with the distributed transactions in embodiments for performing a task such as onboarding new personnel. The data schema may delineate data transactions of various types involving heterogeneous databases. Various microservices may each process data transactions of the various types defined in the data schema for each of the heterogeneous databases. For the example of onboarding new personnel, the personnel database, the benefits database, and the payroll database may be heterogeneous databases, each of which has a different data schema for transactions respectively involving personnel records, benefits records and payroll records. Accordingly in embodiments, the personnel microservice module may process data transactions for the data schema defined for transactions involving personnel records; the benefits microservice module may process data transactions for the data schema defined for transactions involving benefits records; and the payroll microservice module may process data transactions for the data schema defined for transactions involving payroll records.

Those skilled in the art should appreciate that the data transactions for a given task, such as onboarding new personnel for example, may be put in a single data schema, or the data transactions for a given task may be put in several different data schemas for processing by microservices in a cloud computing environment. For the example of onboarding new personnel, the data transactions may be put in several different data schemas and separate data requests may be sent to the transaction coordinator for processing each different data schema. Personnel data, benefits data, and payroll data may each be put in a separate data schema with data transactions, and each of these data schemas may include an indication of different microservices for processing the data transactions in each of these data schemas, such as the personnel microservice module, the benefits microservice module, and the payroll microservice module, respectively. Separate data requests may be sent to the transaction coordinator in embodiments for processing each of these different data schemas with data transactions. In embodiments, the transaction coordinator module 306 described with respect to FIG. 3, may receive a request to perform distributed transactions in a data schema.

At step 504, the server generates a multicast message requesting availability of microservices executing in the cloud computing environment to perform distributed transactions in the data schema. For example, the server may generate a message including an indication of a microservice for processing the data transactions in the data schema that was populated in the data schema and may utilize the network communication service module 308 for sending and receiving messages to and from microservices. In implementation, the network communication service module 308 may provide a UDP tunnel in HTTP or REST protocol messages to broadcast messages via the multicast UDP protocol, provide a RTP tunnel in HTTP or REST protocol messages to broadcast messages via the multicast RTP protocol, or use other multicast or broadcast protocols. In embodiments, the transaction coordinator module 306, described with respect to FIG. 3, may generate a message requesting availability to perform distributed transactions in the data schema and utilize the network communication service module 308 to generate a multicast message to broadcast the message to microservices through a UDP tunnel in HTTP or REST protocol messages, or other multicast or broadcast protocol. Alternatively, the transaction coordinator module 306 may, in an implementation, generate the multicast message itself to broadcast the message to microservices through a UDP tunnel in HTTP or REST protocol messages, or other multicast or broadcast protocol.

At step 506, the server broadcasts a multicast message to microservices requesting availability to perform the distributed transactions in the data schema. Each microservice in the cloud computing environment may be configured to listen to a multicast socket or port for receiving broadcast messages requesting availability to perform the distributed transactions in the data schema included in the broadcast message. In embodiments, the transaction coordinator module 306, described with respect to FIG. 3, may broadcast the multicast message to microservices requesting availability to perform the distributed transactions in the data schema or may utilize the network communication service module 308 for broadcasting the multicast message to microservices.

At step 508, the server receives multicast messages identifying microservices available to perform the distributed transactions in the data schema. For example, in response to the message requesting availability to perform the distributed transactions in the data schema, each instance of a microservice available to perform the distributed transactions in the data schema can send a multicast message to the multicast socket or port of the control group that includes the transaction coordinator module. The multicast message can identify the instance of the microservice and the unicast port for communicating with that instance of the microservice. In embodiments, the transaction coordinator module 306, described with respect to FIG. 3, may receive multicast messages identifying microservices available to perform the distributed transactions in the data schema.

At step 510, the server selects microservices available to perform the distributed transactions in the data schema. For example, there may be several instances of a given microservice available to perform data transactions in the data schema, and the transaction coordinator may select an instance based on any number of considerations, including its location to resources, past response times, current processing load, and successful execution rate of transactions, among other considerations. Furthermore, the transaction coordinator module may select two or more instances of the same microservice in embodiments to perform different individual transactions in the data schema. In embodiments, the transaction coordinator module 306, described with respect to FIG. 3, may select microservices available to perform the distributed transactions in the data schema.

At step 512, the server sends a unicast message requesting preparation to execute the distributed transactions in the data schema to selected microservices. For example, the transaction coordinator may generate an individual unicast message for each selected instance of a microservice that includes the data transactions in the data schema for making preparations to execute. In embodiments, the transaction coordinator may request a selected instance of a microservice to prepare to execute all of the data transaction in the data schema, or the transaction coordinator may request one or more data transaction in the data schema. The transaction coordinator module may utilize the network communication service module for sending unicast messages to the microservices. In embodiments, the transaction coordinator module 306, described with respect to FIG. 3, may send unicast messages requesting preparation to execute the distributed transactions in the data schema to selected microservices.

At step 514, the server receives confirmation of preparation to execute the distributed transactions in the data schema from microservices executing in the cloud computing environment. For example, each instance of a microservice that received a unicast message requesting preparation to perform the distributed transactions in the data schema can prepare to execute the distributed transactions to achieve atomicity, including obtaining resource locking on data in databases to perform the data transactions, allocating sufficient memory for processing the data transactions, allocating sufficient CPU for processing the data transactions, and so forth. Each instance of the microservice that successfully prepared to execute the distributed transactions can send a confirmation to the transaction coordinator indicating the distributed transactions it has prepared to perform. In this way, both various microservices and various instances of a microservice may participate in performing different data transactions specified in the data schema. For instance, each microservice may prepare to perform data transactions of a particular data transaction type appearing in the data schema, such that various microservices each prepared to perform data transactions of different data transaction types. Or there may be multiple instances of a microservice executing that have prepared to perform different data transactions of the same data transaction type.

For instance, referring to the example of onboarding new personnel, the personnel database, the benefits database, and the payroll database may be heterogeneous databases, each of which has a different data schema for transactions respectively involving different data transaction types, namely, personnel records, benefits records, and payroll records. In embodiments, the personnel microservice module may process data transactions in the data schema defined for the data transaction type for personnel records; the benefits microservice module may process data transactions in the data schema for transactions defined for the data transaction type for benefits records; and the payroll microservice module may process data transactions in the data schema for transactions defined for the data transaction type for payroll records. Thus, in response to a unicast message requesting preparation to perform the distributed transactions in a data schema defined to include data transactions for the data transaction type for personnel records, data transactions for the data transaction type for benefits records, and data transactions for the data transaction type for payroll records, the personnel microservice module may prepare to perform data transactions for the data transaction type for personnel records appearing in the data schema. The benefits microservice module may also prepare to perform data transactions for the data transaction type for benefits records appearing in the data schema. And the payroll microservice module may prepare to perform data transactions for the data transaction type for payroll records appearing in the data schema. In this example, each of these microservices may prepare to perform data transactions of a particular data transaction type appearing in the data schema, and each of these microservices may accordingly send confirmation to the transaction coordinator indicating the identified distributed transactions it has prepared to perform. In embodiments, the transaction coordinator module 306, described with respect to FIG. 3, may receive confirmation of preparation to execute the distributed transactions in the data schema from microservices executing in the cloud computing environment.

At step 516, the server determines whether confirmation of preparation to execute each of the distributed transactions in the data schema was received. To provide atomicity of performance of the task for which the data schema was populated with transactions, each of the transactions in the data schema should be performed. If each of the transactions in the data schema cannot be performed at the same time, then all the transactions in the data schema may be aborted, and a subsequent attempt may be made to perform each of the transactions in the data schema at the same time. Accordingly, if the server determines that confirmation of preparation to execute each of the distributed transactions in the data schema was received, then carrying out the steps of the exemplary method continues at step 520. If not, carrying out steps of the exemplary method continues at step 518. In embodiments, the transaction coordinator module 306, described with respect to FIG. 3, may determine whether confirmation of preparation to execute each of the distributed transactions in the data schema was received.

At step 518, the server sends a message to the microservices to abort the transactions in the data schema, if the server determined at step 516 that confirmation of preparation to execute each of the distributed transactions in the data schema was not received. In embodiments, the transaction coordinator module 306, described with respect to FIG. 3, may send a unicast message to the microservices to abort the transactions in the data schema, or may utilize the network communication service module 308 for sending the unicast message to each of the microservices.

At step 520, the server updates the status of distributed transactions in the data schema to reflect aborting the transactions in the data schema at step 518. For example, the transaction coordinator module 306, described with respect to FIG. 3, marks each transaction to be not completed in the transaction database 338, described with respect to FIG. 3. In other embodiments, a transaction database manager may mark each transaction to be not completed in the transaction database 338, described with respect to FIG. 3. And carrying out steps of the exemplary method is finished.

At step 522, the server sends unicast messages to selected microservices to individually execute one or more of the distributed transactions in the data schema, if the server determined at step 516 that confirmation of preparation to execute each of the distributed transactions in the data schema was received. The selected microservices each then execute one or more of the distributed transactions in the data schema, and each of the transactions in the data schema may thus be performed to provide atomicity of performance of the task for which the data schema was populated with transactions. In embodiments, the transaction coordinator module 306, described with respect to FIG. 3, may send unicast messages to selected microservices to individually execute one or more of the distributed transactions in the data schema, or may utilize the network communication service module 308 for sending the unicast message to each of the microservices.

At step 524, the server receives an acknowledgement from each selected microservice that one or more of the distributed transactions in the data schema were executed. In embodiments, the transaction coordinator module 306, described with respect to FIG. 3, may receive an acknowledgement from each selected microservice that one or more of the distributed transactions in the data schema were executed.

At step 526, the server marks each transaction to be complete in the transaction database that was acknowledged to be executed. In embodiments, the transaction coordinator module 306, described with respect to FIG. 3, marks each transaction to be complete in the transaction database 338, described with respect to FIG. 3, that was acknowledged to be executed. In further embodiments, a transaction database manager may mark each transaction to be complete in the transaction database 338, described with respect to FIG. 3, that was acknowledged to be executed.

At step 528, the server sends confirmation to the requester that the distributed transactions in the data schema were executed. For example, the server may send confirmation to the client device that sent the request to perform the distributed transactions in the data schema. In embodiments, the transaction coordinator module 306, described with respect to FIG. 3, may send confirmation to the requester that the distributed transactions in the data schema were executed.

FIG. 6 shows a flowchart of an exemplary method in accordance with aspects of the present disclosure. Steps of the method may be carried out in the environment of FIGS.

2 and 3, and as further described with reference to elements depicted in FIG. 3. In particular, the flowchart of FIG. 6 shows an exemplary method of executing distributed transactions for reliable processing by microservices in a cloud computing environment, in accordance with aspects of the present disclosure.

At step 602, microservices receive a multicast message requesting availability to perform distributed transactions in a data schema. For example, microservices executing in a cloud computing environment can listen to a multicast socket or port for receiving multicast messages requesting availability to perform the distributed transactions in the data schema included in the broadcast message. In embodiments, microservices, such as microservice 310 described with respect to FIG. 3, executing in memory on a server in a cloud computing environment, such as server 302 described with respect to FIG. 3, may receive the multicast message requesting availability to perform distributed transactions in the data schema.

At step 604, the microservice sends a multicast message identifying the microservice is available to perform one or more of the transactions in the data schema. In implementations, the microservice may send the multicast message to the multicast socket or port of the control group that includes the transaction coordinator module. The multicast message can identify the instance of the microservice and the unicast port for communicating with that instance of the microservice. In embodiments, the microservice, such as microservice 310 described with respect to FIG. 3, executing in memory on a server in a cloud computing environment, such as server 302 described with respect to FIG. 3, may send a multicast message identifying the microservice is available to perform one or more of the transactions in the data schema.

At step 606, the microservice receives a unicast message requesting preparation to execute one or more of the distributed transactions in the data schema. For example, the transaction coordinator module may generate an individual unicast message in embodiments for each selected instance of a microservice that includes one or more data transaction in the data schema for making preparations to execute. In embodiments, the microservice, such as microservice 310 described with respect to FIG. 3, executing in memory on a server in a cloud computing environment, such as server 302 described with respect to FIG. 3, may receive the unicast message requesting preparation to execute one or more of the distributed transactions in the data schema.

At step 608, the microservice prepares to execute the transactions including obtaining resource locking on data in databases to perform the data transactions. For instance, each microservice that received the unicast message requesting preparation to execute one or more of the distributed transactions in the data schema can prepare to execute the identified transactions, including obtaining resource locking on data in databases to perform the data transactions, allocating sufficient memory for processing the transactions, allocating sufficient CPU for processing the data transactions, and so forth. Each microservice that successfully prepared to execute the identified distributed transactions can send a confirmation to the transaction coordinator indicating the identified distributed transactions it has prepared to perform. In this way, various microservices may participate in embodiments in performing different data transactions specified in the data schema.

In embodiments, each microservice may prepare to perform data transactions of a particular data transaction type appearing in the data schema, such that various microservices each prepared to perform data transactions of different data transaction types. Alternatively, there may be multiple instances of a microservice executing that have prepared to perform different data transactions of the same data transaction type. For example, there may be two instances of a microservice, a first microservice and a second microservice, that identified a particular transaction that may be performed by the microservice, and each may request resource locking for a particular data transaction in the data schema. The first microservice may be granted resource locking for the particular data transaction in the data schema and is able to be prepared to execute the particular data transaction, while the second microservice is not. The second microservice may be granted resource locking for another data transaction in the data schema and is able to be prepared to execute that particular data transaction, while the first microservice is not. Thus, there may be multiple instances of a microservice executing that have prepared to perform different data transactions of the same data transaction type in the data schema. In embodiments, microservices, such as microservice 310 described with respect to FIG. 3, executing in memory on a server in a cloud computing environment, such as server 302 described with respect to FIG. 3, may prepare to execute the identified distributed transactions including obtaining resource locking on data in databases to perform the data transactions.

At step 610, the microservice sends confirmation of preparation to execute the distributed transactions in the data schema to the transaction coordinator module. Each of the microservices that successfully prepared to perform one or more data transactions in the data schema may accordingly send confirmation in embodiments to the transaction coordinator indicating the identified distributed transactions it has prepared to perform. In an implementation, the microservices may send an acknowledgment to a control group portal that includes the transaction coordinator module. In embodiments, the microservice, such as microservice 310 described with respect to FIG. 3, executing in memory on a server in a cloud computing environment, such as server 302 described with respect to FIG. 3, may send confirmation of preparation to execute the distributed transactions in the data schema to the transaction coordinator module.

At step 612, the microservice receives a unicast message to execute the distributed transactions in the data schema. Upon receiving confirmation of preparation to execute each of the distributed transactions in the data schema, the transaction coordinator module sends unicast messages to selected microservices in embodiments to individually execute one or more of the distributed transactions in the data schema. In embodiments, the microservice, such as microservice 310 described with respect to FIG. 3, executing in memory on a server in a cloud computing environment, such as server 302 described with respect to FIG. 3, may receive the unicast message to execute the distributed transactions in the data schema.

At step 614, the microservice executes the distributed transactions in the data schema. The microservices selected by the transaction coordinator module each execute one or more of the distributed transactions in the data schema to provide atomicity of performance of the task for which the data schema was populated with transactions. In embodiments, the microservice, such as microservice 310 described with respect to FIG. 3, executing in memory on a server in a cloud computing environment, such as server 302 described with respect to FIG. 3, may execute the distributed transactions in the data schema.

At step 616, the microservice sends an acknowledgement to the transaction coordinator module that the distributed transactions in the data schema were executed. Upon successful execution of one or more of the distributed transactions in the data schema, the microservices selected by the transaction coordinator module each send an acknowledgement to the transaction coordinator module that the distributed transactions in the data schema were executed. In implementation, the microservices may send an acknowledgment as a multicast message to a control group portal that includes the transaction coordinator module. In embodiments, the microservice, such as microservice 310 described with respect to FIG. 3, executing in memory on a server in a cloud computing environment, such as server 302 described with respect to FIG. 3, may send an acknowledgement to the transaction coordinator module that the distributed transactions in the data schema were executed.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:
   receiving, by a computing device, a request to process distributed transactions input in a data schema in order to perform a task of an application in a cloud computing environment, wherein the data schema identifies a plurality of types of the distributed transactions involving a respective plurality of databases in the cloud computing environment;
   broadcasting, by the computing device, to a plurality of microservices in the cloud computing environment, a multicast message requesting availability to execute one or more of the plurality of types of the distributed transactions in the data schema;
   sending, by the computing device, one or more messages to one or more of the plurality of microservices in the cloud computing environment to make preparations to execute the one or more of the distributed transactions in the data schema;
   receiving, by the computing device, confirmation of preparation from at least two microservices of the plurality of microservices in the cloud computing environment, the confirmation generated subsequent to resources being locked by the at least two microservices in preparation to execute the one or more of the plurality of types of the distributed transactions in the data schema;
   selecting, by the computing device, a microservice from the at least two microservices based on a location of the resources locked by the at least two microservices;
   sending, by the computing device, at least one message to the selected microservice in the cloud computing environment to execute the one or more of the distributed transactions in the data schema; and receiving, by the computing device, an acknowledgement of the execution of each of the distributed transactions in the data schema from the selected microservice in the cloud computing environment.

2. The method of claim 1, further comprising generating, by the computing device, the multicast message requesting availability from the plurality of microservices to execute the distributed transactions in the data schema.

3. The method of claim 1, further comprising generating, by the computing device, the at least one message to send to the selected microservice in the cloud computing environment to execute the one or more of the distributed transactions in the data schema.

4. The method of claim 1, wherein:

the data schema delineates distributed transactions of various types involving heterogeneous databases in the cloud computing environment; and each of the at least two of the plurality of microservices executes distributed transactions input in the data schema of a different type for each of the heterogeneous databases.

5. The method of claim 1, wherein the broadcasting comprises sending the multicast message to a multicast socket through a User Datagram Protocol tunnel in a REST-ful protocol message.

6. The method of claim 1, further comprising:

receiving, by the computing device, at least one multicast message identifying at least one of the plurality of microservices in the cloud computing environment available to execute the one or more of the distributed transactions in the data schema; and selecting, by the computing device, the microservice responsive to receiving the at least one multicast message.

7. The method of claim 6, wherein the receiving the at least one multicast message identifying the at least one of the plurality of microservices comprises:

receiving an identification of an instance of the microservice; and receiving a unicast port for communicating with that instance of the microservice.

8. The method of claim 1, further comprising marking, by the computing device, each transaction with an acknowledgement of the execution as completed in a transaction database.

9. The method of claim 1, further comprising sending, by the computing device, to the application in the cloud computing environment confirmation that the distributed transactions in the data schema were executed.

10. The method of claim 1, wherein the receiving confirmation comprises receiving confirmation of preparation from two instances of a same microservice to execute different distributed transactions of the one or more of the distributed transactions in the data schema.

11. A system, comprising:

one or more processors, coupled with memory, to:

receive a request to process distributed transactions input in a data schema in order to perform a task of an application in a cloud computing environment, wherein the data schema identifies a plurality of types of the distributed transactions involving a respective plurality of databases in the cloud computing environment;

broadcast, to a plurality of microservices in the cloud computing environment, a multicast message requesting availability to execute one or more of the plurality of types of the distributed transactions in the data schema;

send one or more messages to one or more of the plurality of microservices in the cloud computing environment to make preparations to execute the one or more of the distributed transactions in the data schema;

receive confirmation of preparation from at least two microservices of the plurality of microservices in the cloud computing environment, the confirmation generated subsequent to resources being locked by the at least two microservices in preparation to execute the one or more of the plurality of types of the distributed transactions in the data schema;

select a microservice from the at least two microservices based on a location of the resources locked by the at least two microservices;

send at least one message to the selected microservice in the cloud computing environment to execute the one or more of the distributed transactions in the data schema; and receive an acknowledgement of the execution of each of the distributed transactions in the data schema from the selected microservice in the cloud computing environment.

12. The system of claim 11, wherein the one or more processors further:

generate the multicast message requesting availability from the plurality of microservices to execute the distributed transactions in the data schema.

13. The system of claim 11, wherein the one or more processors further:

generate the at least one message to send to the selected microservice in the cloud computing environment to execute the one or more of the distributed transactions in the data schema.

14. The system of claim 11, wherein:

the data schema delineates distributed transactions of various types involving heterogeneous databases in the cloud computing environment; and each of the at least two of the plurality of microservices executes distributed transactions input in the data schema of a different type for each of the heterogeneous databases.

15. The system of claim 11, wherein to broadcast the multicast message, the one or more processors further:

send the multicast message to a multicast socket through a User Datagram Protocol tunnel in a RESTful protocol message.

16. The system of claim 11, wherein the one or more processors further:

receive at least one multicast message identifying at least one of the plurality of microservices in the cloud computing environment available to execute the one or more of the distributed transactions in the data schema; and select the microservice responsive to receiving the at least one multicast message.

17. The system of claim 16, wherein to receive the at least one multicast message identifying the at least one of the plurality of microservices, the one or more processors further:

receive an identification of an instance of the microservice; and receive a unicast port for communicating with that instance of the microservice.

18. The system of claim 11, wherein the one or more processors further:

mark each transaction with an acknowledgement of the execution as completed in a transaction database.

19. The system of claim 11, wherein the one or more processors further:

send, to the application in the cloud computing environment, confirmation that the distributed transactions in the data schema were executed.

20. The system of claim 11, wherein to receive the confirmation of preparation, the one or more processors further:

receive the confirmation of preparation from two instances of a same microservice to execute different distributed transactions of the one or more of the distributed transactions in the data schema.

21. A non-transitory computer-readable medium storing processor-executable instructions that, when executed by one or more processors, cause the one or more processors:

receive a request to process distributed transactions input in a data schema in order to perform a task of an application in a cloud computing environment, wherein the data schema identifies a plurality of types of the distributed transactions involving a respective plurality of databases in the cloud computing environment;

broadcast, to a plurality of microservices in the cloud computing environment, a multicast message requesting availability to execute one or more of the plurality of types of the distributed transactions in the data schema;

send one or more messages to one or more of the plurality of microservices in the cloud computing environment to make preparations to execute the one or more of the distributed transactions in the data schema;

receive confirmation of preparation from at least two microservices of the plurality of microservices in the cloud computing environment, the confirmation generated subsequent to resources being locked by the at least two microservices in preparation to execute the one or more of the plurality of types of the distributed transactions in the data schema;

select a microservice from the at least two microservices based on a location of the resources locked by the at least two microservices;

send at least one message to the selected microservice in the cloud computing environment to execute the one or more of the distributed transactions in the data schema; and receive an acknowledgement of the execution of each of the distributed transactions in the data schema from the selected microservice in the cloud computing environment.

22. The non-transitory computer-readable medium of claim 21, wherein the processor-executable instructions further include instructions to:

generate the multicast message requesting availability from the plurality of microservices to execute the distributed transactions in the data schema.

* * * * *